United States Patent
Yellin et al.

(10) Patent No.: US 8,644,236 B2
(45) Date of Patent: *Feb. 4, 2014

(54) BALANCING CAPACITY BETWEEN LINK DIRECTIONS USING VARIABLE FEEDBACK RATES

(75) Inventors: Daniel Yellin, Raanana (IL); Yona Perets, Raanana (IL); Itsik Bergel, Givat Shmuel (IL)

(73) Assignee: Marvell World Trade Ltd., St. Michael (BB)

( * ) Notice: Subject to any disclaimer, the term of this patent is extended or adjusted under 35 U.S.C. 154(b) by 322 days.

This patent is subject to a terminal disclaimer.

(21) Appl. No.: 13/204,685

(22) Filed: Aug. 7, 2011

(65) Prior Publication Data

US 2011/0286371 A1 Nov. 24, 2011

Related U.S. Application Data

(63) Continuation of application No. 12/348,003, filed on Jan. 1, 2009, now Pat. No. 8,018,897.

(60) Provisional application No. 61/074,016, filed on Jun. 19, 2008.

(51) Int. Cl.
*H04W 4/00* (2009.01)

(52) U.S. Cl.
USPC ....... 370/329; 370/328; 370/281; 370/395.21

(58) Field of Classification Search
USPC .............................. 370/281, 328, 329, 395.21
See application file for complete search history.

(56) References Cited

U.S. PATENT DOCUMENTS

| | | | |
|---|---|---|---|
| 6,714,514 B1 * | 3/2004 | Espax et al. | 370/230 |
| 6,853,629 B2 | 2/2005 | Alamouti et al. | |
| 2004/0095907 A1 | 5/2004 | Agee et al. | |
| 2004/0120289 A1 | 6/2004 | Hamalainen et al. | |
| 2005/0025093 A1 | 2/2005 | Yun et al. | |
| 2006/0270360 A1 * | 11/2006 | Han et al. | 455/69 |
| 2007/0207730 A1 | 9/2007 | Nguyen et al. | |
| 2007/0281642 A1 | 12/2007 | Gorokhov | |
| 2008/0165836 A1 * | 7/2008 | Landau et al. | 375/221 |
| 2008/0311946 A1 | 12/2008 | Britton | |
| 2009/0067512 A1 | 3/2009 | Mielczarek et al. | |
| 2010/0111211 A1 * | 5/2010 | Han et al. | 375/260 |

OTHER PUBLICATIONS

International Application PCT/IL2008/001649 Search Report dated Mar. 25, 2009.
U.S. Appl. No. 12/348,003 Official Action dated Feb. 7, 2011.

* cited by examiner

*Primary Examiner* — Omer S Mian

(57) ABSTRACT

A method for communication includes providing a first transceiver configured to communicate with a second transceiver over a bi-directional link having a first aggregation of frequencies that are assigned to carry first communication traffic in a first link direction from the first transceiver to the second transceiver and a second aggregation of frequencies that are assigned to carry second communication traffic in a second link direction from the second transceiver to the first transceiver. Communication feedback is transmitted from the first transceiver to the second transceiver communication feedback at an adaptive feedback rate. The feedback rate is determined so as to achieve a desired balance between the information carrying capacities of the first and second aggregations. An information carrying capacity of the second aggregation is controlled responsively to the communication feedback.

14 Claims, 2 Drawing Sheets

BALANCING CAPACITY BETWEEN LINK DIRECTIONS USING VARIABLE FEEDBACK RATES

CROSS-REFERENCE TO RELATED APPLICATION

This application is a continuation of U.S. patent application Ser. No. 12/348,003, filed Jan. 1, 2009, which claims the benefit of U.S. Provisional Patent Application 61/074,016, filed Jun. 19, 2008. The disclosures of these related applications are incorporated herein by reference.

FIELD OF THE INVENTION

The present invention relates generally to communication systems, and specifically to enhancing the traffic capacity of bidirectional communication links.

BACKGROUND OF THE INVENTION

In many modern wireless communication applications, such as cellular networks (and particularly advanced cellular standards, such as LTE), the required traffic capacities in the uplink and downlink directions are not identical. For example, Internet browsing typically requires much higher traffic capacity on the downlink than on the uplink. (In the context of the present patent application and in the claims, the term "traffic capacity" refers to the amount of information that is conveyed over a communication link per unit time.) It has been estimated that the overall downlink traffic demand in wireless networks is between three and ten times larger than the corresponding uplink demand. In commercial wireless networks that use frequency-domain duplexing (FDD), however, the available frequency spectrum is usually partitioned in a fixed manner (typically equal) between downlink and uplink.

Because of the mismatch between traffic demand and frequency allocation, wireless networks fail to make full use of the available traffic capacity of both the uplink and the downlink simultaneously, and are therefore limited by the capacity of one of the link directions. As a result, FDD networks make sub-optimal use of their available transmission spectrum. Furthermore, even if the frequency spectrum were to be divided unequally between uplink and downlink, to achieve a better match to the traffic demand, some inefficiency would still remain, as traffic loads in the uplink and downlink directions may change over time.

SUMMARY

An embodiment disclosed herein provides a method for communication, including providing a first transceiver configured to communicate with a second transceiver over a bi-directional link having a first aggregation of frequencies that are assigned to carry first communication traffic in a first link direction from the first transceiver to the second transceiver and a second aggregation of frequencies that are assigned to carry second communication traffic in a second link direction from the second transceiver to the first transceiver. Communication feedback is transmitted from the first transceiver to the second transceiver at an adaptive feedback rate. An information carrying capacity of the second aggregation is controlled responsively to the communication feedback.

Another embodiment provides a method for communication that includes configuring a base station to communicate with one or more mobile terminals over a bi-directional link having a first aggregation of frequencies that are assigned to carry uplink communication traffic from the mobile terminals to the base station and a second aggregation of frequencies that are assigned to carry downlink communication traffic from the base station to the mobile terminals. Communication feedback is received at the base station from at least one of the mobile terminals at an adaptive feedback rate. An information carrying capacity of the second aggregation is controlled responsively to the communication feedback.

Yet another embodiment provide a method for communication, including configuring a mobile terminal to communicate with a base station over a bi-directional link having a first aggregation of frequencies that are assigned to carry uplink communication traffic from the mobile terminal to the base station and a second aggregation of frequencies that are assigned to carry downlink communication traffic from the base station to the mobile terminal. Communication feedback is transmitted from the mobile terminal to the base station at an adaptive feedback rate so as to cause the base station to control an information carrying capacity of the second aggregation responsively to the communication feedback.

In another embodiment, control (feedback) data is transmitted from the base station to the mobile terminal in order to increase uplink capacity.

There is additionally provided, in accordance with another embodiment, apparatus for communication, including a first transceiver, which is configured to communicate with a second transceiver over a bi-directional link having a first aggregation of frequencies that are assigned to carry first communication traffic in a first link direction from the first transceiver to the second transceiver and a second aggregation of frequencies that are assigned to carry second communication traffic in a second link direction from the second transceiver to the first transceiver. The first transceiver is configured to transmit communication feedback at an adaptive feedback rate to the second transceiver, and to receive data that is transmitted from the second transceiver over the second aggregation at an information carrying capacity that is responsive to the communication feedback.

A further embodiment provides apparatus for communication, including a base station and one or more antennas coupled to the base station. The base station is configured to communicate, via the one or more antennas, with one or more mobile terminals over a bi-directional link having a first aggregation of frequencies that are assigned to carry uplink communication traffic from the mobile terminals to the base station and a second aggregation of frequencies that are assigned to carry downlink communication traffic from the base station to the mobile terminals, and to receive communication feedback from at least one of the mobile terminals at an adaptive feedback rate, and to control an information carrying capacity of the second aggregation responsively to the communication feedback.

Another embodiment provides apparatus for communication, including a mobile terminal and one or more antennas coupled to the mobile terminal. The mobile terminal is configured to communicate, via the one or more antennas, with a base station over a bi-directional link having a first aggregation of frequencies that are assigned to carry uplink communication traffic from the mobile terminal to the base station and a second aggregation of frequencies that are assigned to carry downlink communication traffic from the base station to the mobile terminal, and to transmit communication feedback to the base station at an adaptive feedback rate so as to control an information carrying capacity of the second aggregation responsively to the communication feedback.

There is moreover provided, in accordance with yet another embodiment, apparatus for communication, including first and second transceivers, which are configured to communicate over a bi-directional link having a first aggregation of frequencies that are assigned to carry first communication traffic in a first link direction from the first transceiver to the second transceiver and a second aggregation of frequencies that are assigned to carry second communication traffic in a second link direction from the second transceiver to the first transceiver. The first transceiver is configured to transmit communication feedback at an adaptive feedback rate to the second transceiver, so as to control an information carrying capacity of the second aggregation responsively to the communication feedback.

The present invention will be more fully understood from the following detailed description of the embodiments thereof, taken together with the drawings in which:

DETAILED DESCRIPTION OF EMBODIMENTS

Figure 1:
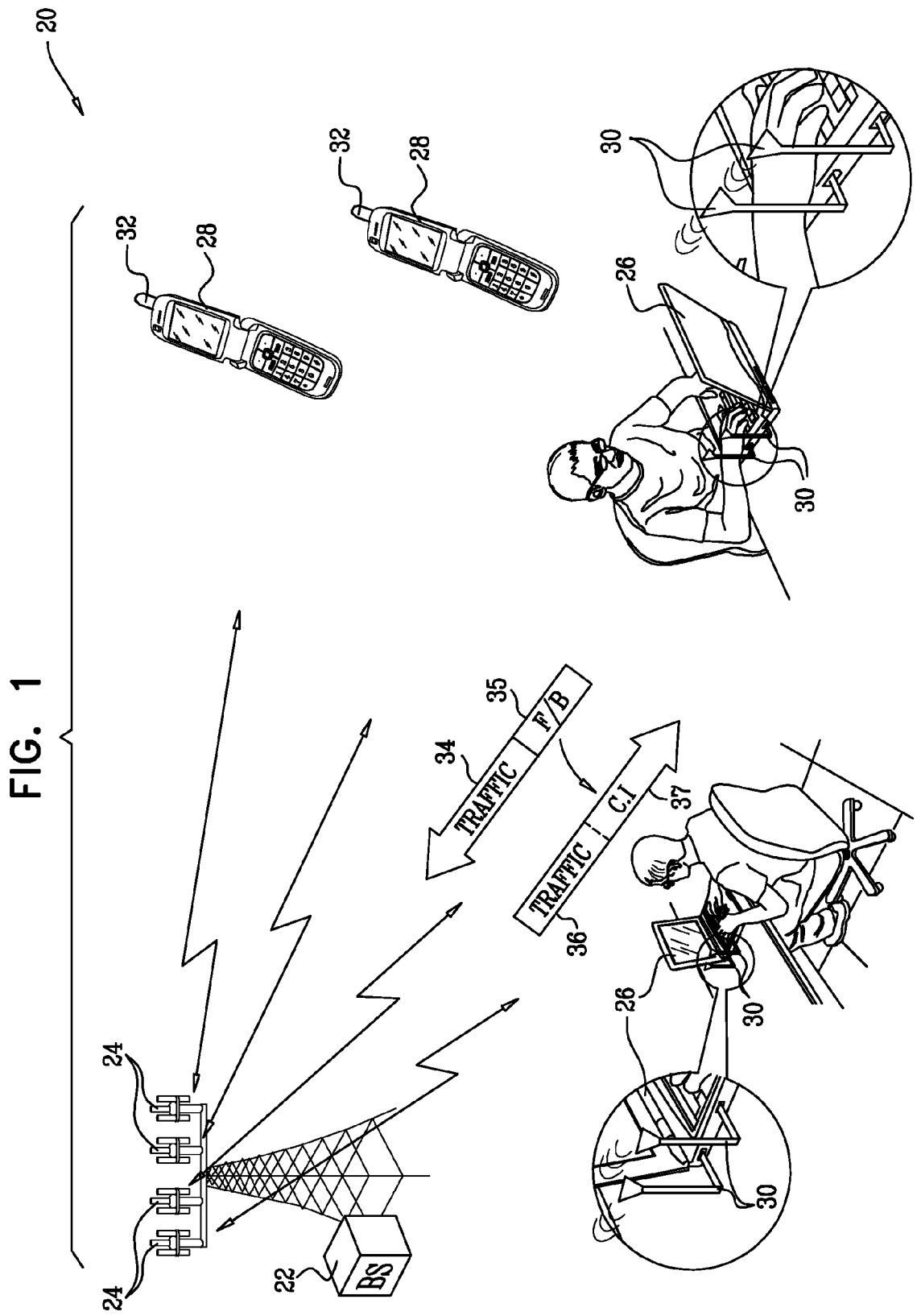
FIG. 1 is a schematic, pictorial illustration of a wireless communication network, in accordance with an embodiment of the present invention.

Embodiments that are described hereinbelow address and mitigate the mismatch between the frequency spectra (i.e., the bandwidths) that are allocated to the two link directions in a bidirectional link and the demand for traffic capacity in the two directions. These embodiments are useful, for example, in wireless FDD systems, in which the spectra are fixed while the mismatch between bandwidth and traffic demand can be large and variable. Therefore, the embodiments described hereinbelow relate to downlink and uplink communications between a base station and mobile terminals in such a system. The principles described herein, however, may also be applied in enhancing the traffic capacity of other sorts of bidirectional links.

Embodiments that are described herein variably balance the traffic capacities of two link directions, such as the uplink (UL) and downlink (DL) capacities in FDD systems based on feedback. This approach enables dynamic balancing of the DL/UL capacities relative to the instantaneous traffic load, by adaptively tuning a feedback rate on one of the link directions to meet the capacity requirements in the other link direction. In one embodiment, first and second transceivers are assigned respective first and second aggregations of frequencies, which may or may not be in contiguous ranges, for carrying communication traffic over a bi-directional link. One (or both) of the transceivers transmits communication feedback at an adaptive rate (thus occupying a non-uniform part of the available bandwidth) to the other transceiver. The information carrying capacity of the other link direction is controlled responsively to the communication feedback.

The idea behind this approach is that many modern communication techniques can significantly increase the system traffic throughput when a transmitter has good information regarding the state of the transmission channel. This information can be provided in the form of feedback from the receiver to the transmitter, which then sets transmission parameters accordingly. The higher the feedback rate (up to some limit), the more accurately will the transmitter be able to adjust the transmission parameters, and thus increase the amount of information that it transmits over a given bandwidth. The higher feedback rate may be applied, for example, to increasing the frequency granularity at which carrier quality feedback is provided (i.e., feedback is provided regarding more carriers with smaller intervals between reported carriers). When an increased granularity of feedback is provided, the transmitter may adaptively apply better transmission parameters for each of a greater number of carriers. Conversely, when a reduced granularity of feedback is available, the transmitter may apply more generalized and less optimal transmission parameters to transmitted data.

Some parameters may reduce bit errors due to noise and interference at the receiver, for example, but their application comes at the cost of reduced traffic capacity. This point may be seen, for instance, in the application of encoding schemes. Stronger encoding schemes may reduce bit errors, but they may correspondingly require greater bandwidth. Conversely, weaker encoding schemes can also result in reduced traffic capacity by necessitating retransmission of data that is received in error.

The increased granularity of feedback may facilitate adaptively applying more optimal transmission parameters to ranges of carrier frequencies that are defined with increased precision. The concept of applying transmission parameters according to greater frequency resolution in response to feedback may also be valid for other transmission parameters such as MIMO transmission parameters, for example.

In accordance with an embodiment, excess uplink capacity, when available, is employed to provide quality feedback at a greater granularity, which results in a greater feedback rate on the uplink. Different encoding schemes, for example, or other transmission parameters, may be applied to carriers with a greater range of frequency precision, thereby facilitating an increase in traffic capacity on the downlink. The quantity of feedback is adapted to the available uplink capacity, and the granularity of encoding applied to downlink data may be correspondingly adapted to the granularity of the feedback. Multiple-input-multiple-output (MIMO) transmission schemes, for example, are well suited to this type of feedback-based adjustment.

Embodiments that are described herein may be useful in exploiting unused traffic capacity in one link direction to enhance the available capacity in the other direction. For example, in an FDD system in which the uplink traffic does not use the entire available bandwidth, the feedback rate on the uplink can be increased in order to increase the traffic capacity on the downlink, so as to better exploit the available bandwidth and improve balance and efficiency of the network. The feedback rate, for example, can be dynamically varied, thus allowing the network operator to alter the DL/UL capacities in the system based on the desired relation between uplink and downlink traffic capacities at different times, and possibly in different locations and/or for different subscribers.

FIG. 1 is a schematic, pictorial illustration of a wireless communication network 20, in accordance with an embodiment of the present invention. In this example, network 20 is assumed to be a FDD cellular communication network, with MIMO capabilities. Such a network may be compliant with LTE standards promulgated by the $3^{rd}$ Generation Partnership Program (3GPP), for instance. A base station 22 communicates with mobile terminals 26, 28 using a certain aggregation of frequencies for downlink communications to the mobile terminals and another aggregation of frequencies for uplink communications from the mobile terminals to the base station. In accordance with classical cellular network convention, the term "mobile terminal" is used generally, for convenience, to refer to any and all user equipment in network 20, including user equipment that may be stationary. The base station and mobile terminals in this example are specific types of wireless transceivers, but the principles described in the present disclosure are similarly applicable to transceivers and networks of other types.

Base station 22 and mobile terminals 26, 28 exchange uplink and downlink traffic, indicated in the figure by arrows 34 and 36, respectively, over their respective frequency aggregations. Base station 22 has multiple antennas 24, which it drives using suitable MIMO techniques, as are known in the art. The base station applies MIMO transmission parameters, in the form of complex (amplitude/phase) coefficients, to control the phases and amplitudes of the signals transmitted by the different antennas 24 (possibly with different coefficients for different frequencies). The base station computes these parameters on the basis of feedback 35 received from mobile terminals 26, 28. The rate of feedback is adaptive, i.e., it may be varied, typically under control of the network operator, over time and even among different mobile terminals 26, 28. Increasing the feedback rate on the uplink gives a capacity increase (C.I.) 37 on the downlink. Details of the techniques that may be used for this purpose are described hereinbelow.

Additionally or alternatively, a similar sort of adaptive feedback can be transmitted from base station 22 to mobile terminals 26 and/or 28, for use in controlling uplink transmission parameters. Some mobile terminals (such as terminals 26 in FIG. 1) have multiple antennas 30, which can transmit and receive in a MIMO configuration with transmission parameters based on feedback from the base station. As another alternative, the mobile terminals (even terminals 28, with only a single antenna 32) can operate cooperatively in a "virtual-MIMO" configuration with feedback-based transmission parameters.

Figure 2:
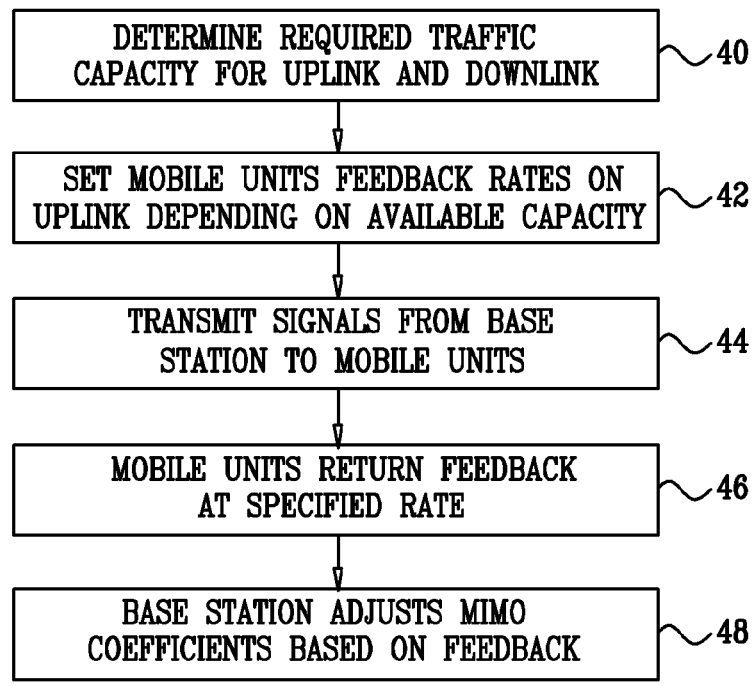
FIG. 2 is a flow chart that schematically illustrates a method for controlling communications using feedback, in accordance with an embodiment of the present invention.

FIG. 2 is a flow chart that schematically illustrates a method for controlling communications using feedback, in accordance with an embodiment of the present invention. The method is described hereinbelow, for the sake of clarity, with specific reference to enhancing the information carrying capacity of downlink transmissions in system 20 (FIG. 1), but the principles of this method may be suitably adapted and similarly applied on the uplink, as well as in other systems.

Typically, particularly in FDD networks, the bandwidths that are allocated for uplink and downlink communications are pre-assigned and fixed by the applicable standard and/or allocated by relevant governing bodies. The present method, however, allows the network operator to adjust the traffic capacities (i.e., the amounts of information that are carried by the uplink and downlink) of the allocated bandwidths in order to make more optimal use of the available bandwidth.

For this purpose, the network operator determines the required traffic capacity on the uplink and downlink, at a requirement determination step 40. This determination may be made by a human administrator, based on reports of traffic statistics, for example, or it may be carried out automatically, by a suitable processor associated with the network. In general, the determination of the required traffic capacity looks to the desired relation between uplink and downlink traffic capacities. The desired relation is determined according to the instantaneous demand for communication traffic in each direction, as well as the specific user types and priorities. The determination of required capacity typically varies over time and so may be reevaluated and changed periodically. Furthermore, the capacity requirements may change at different times of day or under different network conditions and may even vary among different mobile terminals.

As explained above, base station 22 sets MIMO transmission parameters for antennas 24 on the basis of feedback provided by mobile terminals 26, 28 regarding downlink channel conditions. The data rate of this feedback determines how accurately the channel conditions are reported to the base station; but the feedback takes up a portion of the uplink bandwidth, possibly a portion of the data channel, at the expense of uplink traffic capacity. The network operator therefore sets the feedback rate based on the relation between the desired downlink capacity and the available uplink capacity, at a rate setting step 42.

Various measures may be used for finding and implementing the desired balance between uplink and downlink. For instance, measures of total network throughput, edge cell user throughput, coverage, interference among cells, etc., may be used in capacity balancing. If there is available uplink capacity that is not used for carrying communication traffic, the network may set an even higher feedback rate in order to maximize the downlink capacity. The feedback rate need not be uniform over the entire network and may vary, for example, among different geographical regions and/or different mobile terminals.

Base station 22 transmits signals to mobile terminals 26, 28, at a signal transmission step 44. The signals are typically pilot signals, which are transmitted from each of antennas 24 individually, and may also be divided into different frequency bins or groups if network 20 uses frequency division multiplexing (FDM). Mobile terminals 26, 28 measure the power and phase of each of these signals. At a feedback transmission step 46, the mobile terminals return the measured values to base station 22 as feedback at the appropriate rate, such as the feedback rate that was set at step 42. The feedback may be transmitted by the mobile terminals over traffic channels, which are otherwise used for carrying user data, or over control (signaling) channels, or both. For example, the feedback may be carried by a control channel as long as the control channel has available capacity, and then the excess part of the feedback may be carried by the traffic (data) channel when the capacity of the control channel is exceeded.

The feedback rate that is used at step 46 may determine, for example, the resolution, in bits, of the measurement data that are transmitted to the base station by the mobile stations. (A variable-resolution scheme of this sort is described hereinbelow with reference to FIG. 3.) In FDM schemes, the increase in feedback rate may be exploited, alternatively or additionally, to provide finer frequency granularity, so that each measurement reported by the mobile terminals covers a relatively small number of frequency bins, and therefore improves the performance of downlink data transmission over each group of frequency bins.

Base station 22 computes MIMO coefficients for downlink transmission to mobile terminal 26, 28 based on the feedback that it has received, at a coefficient computation step 48. Typically, the coefficients are computed for each mobile terminal based on the channel conditions that it has reported and possibly, in multi-user schemes, based on feedback from other mobile terminals, as well. The base station then transmits information to mobile terminals 26, 28 via antennas 24, using these MIMO coefficients. The precision of the MIMO coefficients, and hence the downlink traffic throughput, generally increases with the resolution of the feedback.

Various different types of MIMO schemes may be used in system 20 and benefit from the method described above. The following are some examples:

MIMO techniques can be applied by the base station in transmitting several data streams simultaneously to a mobile terminal, using spatial multiplexing and multiple antennas both at the base station and the mobile terminal. Basic MIMO operation can be achieved with a very low feedback rate, but higher-rate feedback can increase the achievable traffic capacity of the link by providing better decomposition of the channel and optimal power allocation for each data stream.

In multi-user MIMO, the base station transmits several data streams to several mobile terminals simultaneously using spatial multiplexing and multiple antennas at least at the base station. The MIMO coefficients are calculated so as to reduce the interference at each mobile terminal due to the signals transmitted to the other mobile terminals. (One example of this sort of technique is transmit zero-forcing, which aims to completely zero the interference caused by the signals transmitted to other terminals.) The interference between the different signals is dependent mainly on the quality of the channel estimates available to the base station. Therefore, a large reduction in the interference can be achieved by improving the quality of the channel estimates, i.e., by increasing the feedback rate. Reduced interference can result in a large increase in the achievable downlink traffic capacity by reducing the bit-error rate, thereby reducing the need for retransmission and enabling the use of weaker encoding.

Multi-cell MIMO techniques use the antennas of multiple base stations to transmit several data streams to mobile terminals. One technique in this family is multi-user-multi-cell-MIMO, in which multiple base stations transmit data simultaneously to multiple mobile terminals. The cooperative operation of several base stations both increases the signal power in each of the data streams and reduces interference from neighboring base stations. Efficient use of multi-cell-MIMO requires higher feedback rates, because the mobile terminals are required to send channel state information with respect to each of the base stations. The level of interference depends strongly on the quality of the channel estimates, and there is therefore a strong trade-off between channel capacity and feedback rate.

Although the examples described above relate to the use of uplink feedback in enhancing downlink traffic capacity, downlink feedback can be used, by the same token, to increase the uplink traffic capacity using downlink resources. In cellular communication systems that are known in the art, the base station is typically the coordinator of the network, and therefore generally transmits little, if any, explicit channel information to the mobile terminal. The base station may, however, increase its feedback rate to the mobile terminals in the form of more detailed control commands, which tell the mobile terminals how to compose the signals that they transmit in order to make best use the channel.

A number of MIMO schemes may be used for uplink transmission and may benefit from increased feedback on the downlink. Examples include the following:

MIMO operates similarly on the uplink to the downlink operation described above, but uses a different sort of feedback mechanism. The base station estimates the uplink channel conditions and decides on the best transmission strategy. It then transmit a downlink control message, which tells the mobile terminal how to compose its uplink transmission, including the codebook and weights that should be used. To make best use of the channel state information, it is desirable that the base station be able to choose among many possible codebooks and weights, and therefore requires a large control message to specify the choice it has made. The larger the control message, the more downlink traffic capacity is used by the base station in transmitting the message, and the greater is the enhancement achieved accordingly in the uplink traffic capacity.

Virtual-MIMO is a form of multi-user MIMO in which a number of mobile terminals transmit data signals simultaneously to the base station (which receives the signals using multiple antennas). The interference between the different mobile terminals depends strongly on the proper choice of codebook and weights that are used by each mobile terminal, in order to achieve optimal transmission for given channel conditions. A large increase in the uplink traffic capacity can be achieved by increasing the size of the downlink control messages in order to improve the quality of the selection of codebook and weights. A variant of this technique can be used in multi-cell virtual MIMO, in which several base stations jointly receive data from multiple mobile terminals.

Figure 3:
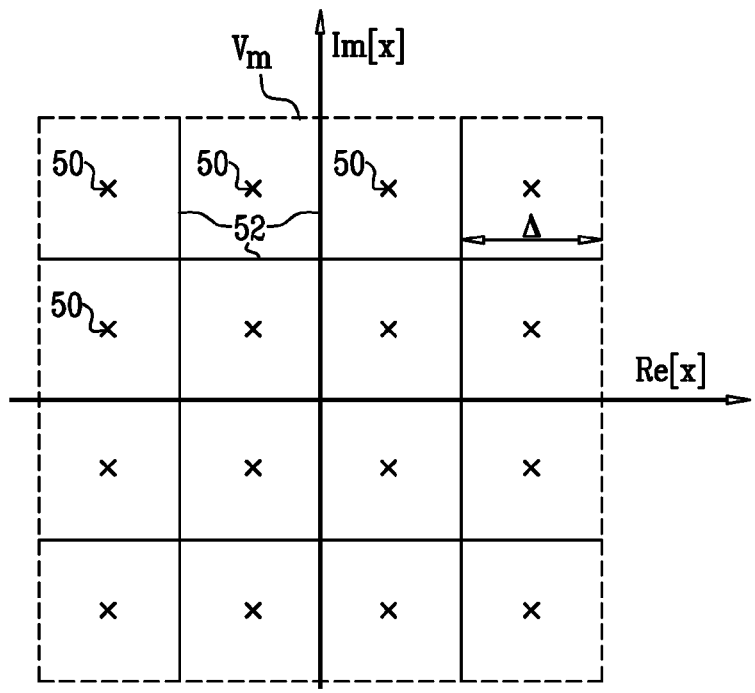
FIG. 3 is a plot that schematically illustrates a variable quantization scheme, in accordance with an embodiment of the present invention.

Although the above examples relate specifically to MIMO transmission schemes, feedback may also be used to increase traffic capacity in other ways. For example, the transmitter may use feedback-based "water-filling" methods to better allocate the transmitted power across the allocated bandwidth. Increasing the feedback rate can improve water-filling performance, especially on links with low signal/noise ratio. As another example, in incremental redundancy (IR) schemes, when a packet transmission failure occurs, additional redundancy bits are transmitted and used together with the previously-received bits for packet decoding at the receiver. Feedback from the receiver may be used by the transmitter in selecting the best IR version to use in order to optimize packet reception. An increased feedback rate allows a larger selection of IR versions and hence enhanced effectiveness in retransmission. FIG. 3 is a plot that schematically illustrates a variable quantization scheme, in accordance with an embodiment of the present invention. This scheme illustrates the effect of quantization in increasing or decreasing the resolution of channel estimation feedback, and shows how finer quantization can be used, in conjunction with an increased uplink feedback rate, to enhance downlink traffic capacity.

As noted earlier, channel estimation by mobile terminals is typically based on pilot symbols transmitted by the base station. The mobile terminal receives these pilot symbols and then filters them over time and frequency in order to generate a channel estimate for each frequency bin (or over all frequencies if frequency-discrimination is not used). This channel estimate can be represented as a complex number for each frequency bin. To convey the channel estimate back to the base station, the mobile terminal first quantizes the complex numbers to a predetermined number of bits, and then transmits the quantized numbers to the base station in a predefined transmission format.

At the most basic level of channel quantization, the feedback may consist only of the signal level (power) indication. Four bits may be used, for example, to describe the mean received signal over all antennas and all frequencies. At finer resolution, the feedback may include information about the frequency variation of the channel characteristics and/or the phase difference between the different antennas.

The scheme shown in FIG. 3, for example, shows the effect of a uniform quantizer operating on the measurements made by a mobile terminal for a given antenna and frequency bin (although joint quantization of measurements from different antennas and/or different frequency bins may also be used). The quantizer outputs a single complex number representing the amplitude and phase of the received signal in the frequency bin in question by first truncating the measured signal value and then finding the nearest value—represented by x-marks 50—in the quantization scheme. Lines 52 mark the boundaries between decision areas. In the example shown in the figure, the quantizer output is a four-bit number with uniform quantization, although non-uniform quantization schemes may alternatively be used.

The number of bits that are required to represent a set of quantized values is determined by the quantization limit $V_m$ and the quantization step size $\Delta$. Specifically, the number of bits required for uniform quantization is twice the smallest integer that is larger than $\log_2(V_m/\Delta)$. A larger quantization limit and/or smaller quantization step will provide finer resolution but require more bits.

A similar sort of quantization may be required for several frequency bins and/or several antennas: If the total bandwidth sampled by the mobile terminal is W [Hz], and the mobile terminal transmits feedback with respect to frequency bins that are B [Hz] apart, the feedback from the mobile terminal to the base station will include the above quantized data for W/B frequency bins. If the mobile terminal reports the channel measured from N antennas at the base station, then the report size is further multiplied by N.

The base station can control the feedback rate over a large range by setting the values of the quantization limit ($V_m$), the quantization step ($\Delta$) and the reporting frequency interval (B). The feedback data size, in bits, for the example of uniform quantization described above is approximately $(NW/B)\log_2(V_m/\Delta)$, which can vary from a minimum of four bits up to hundreds of bits per feedback message.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   in a first transceiver, communicating with a second transceiver over a bi-directional link which carries information including data traffic and communication feedback in a first link direction from the first transceiver to the second transceiver and which carries information including communication traffic in a second link direction from the second transceiver to the first transceiver, wherein communicating with the second transceiver comprises allocating a first portion of capacity of the bi-directional link in the first link direction to the data traffic;
   setting a feedback rate, in the first transceiver, for the communication feedback to be transmitted in the first link direction, wherein the feedback rate is set based on a current capacity requirement of the bi-directional link for the communication traffic carried in the second link direction and based on the first portion of capacity;
   wherein setting the feedback rate comprises calculating the feedback rate by utilizing a second portion of capacity obtained by deducting the first portion from total capacity of the bi-directional link in the first link direction, and wherein setting the feedback rate further comprises increasing the feedback rate to cause an information carrying capacity of the bi-directional link in the second link direction to increase or decreasing the feedback rate to cause the information carrying capacity of the bi-directional link in the second link direction to decrease, in order to meet the current capacity requirement; and
   transmitting the communication feedback from the first transceiver to the second transceiver at the set feedback rate.

2. The method according to claim 1, wherein setting the feedback rate comprises setting a desired balance between capacities of the bi-directional link in the first and second link directions.

3. The method according to claim 1, wherein communicating with the second transceiver comprises transmitting in the first link direction and receiving in the second link direction in a frequency-domain duplexing (FDD) mode.

4. The method according to claim 1, wherein transmitting the communication feedback comprises transmitting channel information, and wherein setting the feedback rate comprises causing the second transceiver to adjust transmission parameters of the second transceiver responsively to the channel information.

5. The method according to claim 1, wherein transmitting the communication feedback comprises transmitting channel information, and wherein setting the feedback rate comprises varying a resolution of the channel information.

6. The method according to claim 1, wherein setting the feedback rate comprises adjusting a number of bits used to quantize a measure of a pilot signal received by the first transceiver from the second transceiver.

7. The method according to claim 1, wherein transmitting the communication feedback comprises sending a first part of the communication feedback over a control channel that is separate from a data channel, and sending a second part of the communication feedback over the data channel, wherein the data channel is not allocated to the data traffic.

8. The method according to claim 1, wherein setting the feedback rate comprises increasing the feedback rate while reducing the capacity available in the first link direction for data traffic causing an increase the information carrying capacity in the second link direction.

9. The method according to claim 1, wherein setting the feedback rate comprises adjusting a frequency granularity for the communication feedback and providing the communication feedback for different quantities of frequency ranges based on the frequency granularity.

10. Apparatus, comprising:
    one or more antennas; and
    a first transceiver, which is configured to communicate with a second transceiver over a bi-directional link that carries information including data traffic and communication feedback in a first link direction from the first transceiver to the second transceiver and carries information including communication traffic in a second link direction from the second transceiver to the first transceiver, wherein communicating with the second transceiver comprises allocating a first portion of capacity of the bi-directional link in the first link direction to the data traffic,
    and is further configured to set a feedback rate for the communication feedback to be transmitted in the first link direction, wherein the feedback rate is set based on a current capacity requirement of the bi-directional link for the communication traffic carried in the second link direction and based on the first portion of capacity;
    wherein setting the feedback rate comprises calculating the feedback rate by utilizing a second portion of capacity obtained by deducting the first portion from total capacity of the bi-directional link in the first link direction, and wherein setting the feedback rate further comprises increasing the feedback rate to cause an information carrying capacity of the bi-directional link in the second link direction to increase or decreasing the feedback rate to cause the information carrying capacity of the bi-directional link in the second link direction to decrease, in order to meet the current capacity requirement; and is further configured to transmit the communication feedback to the second transceiver at the set feedback rate.

11. The apparatus according to claim 10, wherein the first transceiver is configured to choose the feedback rate by setting a desired balance between respective information carrying capacities of the first and second link directions.

12. The apparatus according to claim 10, wherein the communication feedback comprises channel information, and wherein, by setting the feedback rate, the first transceiver is configured to cause the second transceiver to adjust transmission parameters of the second transceiver responsively to the channel information.

13. The apparatus according to claim 10, wherein the communication feedback comprises channel information, and wherein the first transceiver is configured to set the feedback rate by varying a resolution of the channel information.

14. A mobile communication terminal comprising the apparatus of claim 10.

* * * * *